United States Patent Office 3,261,829
Patented July 19, 1966

3,261,829
SPIRO(STEROIDAL-6,3'-1-PYRAZOLINES)
AND PROCESS
Frank B. Colton, Evanston, and Robert T. Nicholson, Glenview, Ill., assignors to G. D. Searle & Co., Chicago, Ill., a corporation of Delaware
No Drawing. Filed Aug. 12, 1964, Ser. No. 389,183
11 Claims. (Cl. 260—239.5)

The present invention relates to novel steroidal derivatives possessing a spiro-heterocyclic substituent and to to the novel process for their manufacture. The spiro (steroidal-6,3'-1-pyrazolines) encompassed can be represented by the following partial formula, depicting the structure of the A and B rings,

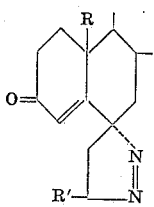

wherein R can be hydrogen or a methyl radical, and R' is hydrogen or a lower alkyl radical. The C and D rings of the cyclopentanophenanthrene nucleus can be variously substituted as is exemplified hereinafter.

The lower alkyl radicals symbolized by R' are, typically, methyl, ethyl, propyl, butyl, pentyl, hexyl, and the branched-chain isomers thereof.

The novel process of the present invention is illustrated by the following partial structural formulas:

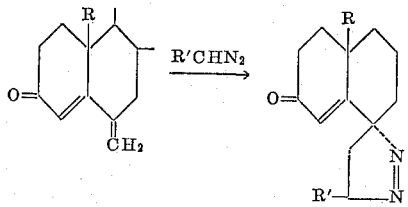

wherein R and R' are as defined hereinbefore. The 6-methylene starting materials shown in the latter representation and methods for their manufacture are described in U.S. Patents 2,980,711 and 3,112,305. This process is conveniently conducted by contacting a 6-methylene steroid with the appropriate diazo(lower alkane) in a suitable organic solvent medium, suitably at or near room temperature, until the reaction is complete, then removing the water-immiscible solvent by distillation and diluting the residual solution with water to precipitate the crude product. Purification is effected by the usual techniques known to the organic chemist. A suitable solvent medium is diethyl ether-tetrahydrofuran. Illustrative of the instant process is the reaction of 17α-acetoxy-6-methylenepregn-4-ene-3,20-dione (U.S. Patent 2,980,-711) with diazoethane in tetrahydrofuran-diethyl ether at room temperature to yield 17α-acetoxy-3,20-dioxo-spiro[pregn-4-ene-6,3'-(5'-methyl-1-pyrazoline)]. The 6-methylene starting materials and 6-spiro-pyrazolines of this invention derived therefrom are further exemplified as follows:

6-methyleneandrost-4-ene-3,17-done:
    3,17-dioxo-spiro(androst-4-ene-6,3'-1-pyrazoline).
17β-acetoxy-6-methyleneandrost-4-en-3-one:
    17β-acetoxy-3-oxo-spiro(androst-4-ene-6,3'-1-pyrazoline).
17β-hydroxy-17α-methyl-6-methyleneandrost-4-en-3-one:
    17β-hydroxy-17α-methyl-3-oxo-spiro(androst-4-ene-6,3'-1-pyrazoline).
17β-hydroxy-6-methyleneandrost-4-en-3-one:
    17β-hydroxy-3-oxo-spiro(androst-4-ene-6,3'-1-pyrazoline).
17β-acetoxy-17α-methyl-6-methyleneandrost-4-en-3-one:
    17β-acetoxy-17α-methyl-3-oxo-spiro-(androst-4-ene-6,3'-1-pyrazoline).
17β-acetoxy-6-methylene-estr-4-en-3-one:
    17β-acetoxy-3-oxo-spiro(estr-4-ene-6,3'-1-pyrazoline).
17β-acetoxy-17α-vinyl-6-methyleneandrost-4-en-3-one:
    17β-acetoxy-3-oxo-17α-vinyl-spiro(androst-4-ene-6,3'-1-pyrazoline).
17β-propionoxy-17α-propynyl-6-methyleneandrost-4-en-one:
    3-oxo-17β-propionoxy-17α-propynyl-spiro-(androst-4-ene-6,3'-1-pyrazoline).
17α-ethynyl-17β-hydroxy-6-methyleneandrost-4-en-3-one:
    17α-ethynyl-17β-hydroxy-3-oxo-spiro-(androst-4-ene-6,3'-1-pyrazoline).
17α-ethyl-17β-hydroxy-6-methyleneandrost-4-en-3-one:
    17α-ethyl-17β-hydroxy-3-oxo-spiro(androst4-ene-6,3'-1-pyrazoline).
17β-propionoxy-6-methyleneandrost-4-en-3-one:
    3-oxo-17β-propionoxy-spiro(androst-4-ene-6,3'-1-pyrazoline).
6-methylenepregn-4-ene-3,20-dione:
    3,20-dioxo-spiro(pregn-4-ene-6,3'-1-pyrazoline).
17α-acetoxy-6-methylenepregn-4-ene-3,20-dione:
    17a-acetoxy-3,20-dioxo-spiro(pregn-4-ene-6,3'-1-pyrazoline).
6-methylene-17α-propionoxypregn-4-ene-3,20-dione:
    17α-propionoxy-3,20-dioxo-spiro(pregn-4-ene-6,3'-1-pyrazoline).
17α-actoxy-21-fluroro-6-methylenepregn-4-ene-3,20-dione:
    17α-acetoxy-21-fluro-3,20-dioxo-spiro(pregn-4-ene-6,3'-1-pyrazoline).
3-(17β-hydroxy-3-oxoandrost-4-en-17α-yl) propionic acid lactone:
    3-[17β-hydroxy-3-oxo-spiro(androst-4-ene-6,3'-1-pyrazolin)-17α-yl] propionic acid lactone.
21-acetoxy-6-methylenepregn-4-ene-3,20-dione:
    21-acetoxy-3,20-dioxo-spiro(pregn-4-ene-6,3'-1-pyrazoline).
21-acetoxy-17α-hydroxy-6-methylenepregn-4-ene-3,20-dione:
    21-acetoxy-17α-hydroxy-3,20-dioxo-spiro(pregn-4-ene-6,3'-1-pyrazoline).
21-acetoxy-17α-hydroxy-6-methylenepregn-4-ene-3,11,20-trione:
    21-acetoxy-17α-hydroxy-3,11,20-trioxo-spiro(pregn-4-ene-6,3'-1-pyrazoline).
21-acetoxy-11β,17α-dihydroxy-6-methylenepregn-4-ene-3,20-dione:
    21-acetoxy-11β,17α-dihydroxy-3,20-dioxo-spiro(pregn-4-ene-6,3'-1-pyrazoline).

The compounds of this invention are useful as a result of their valuable pharmacological properties. Those derivatives containing the testosterone and 19-nortestosterone structure are anabolic and androgenic agents; those containing the progesterone, 17-alkenyl-testosterone and 17-alkynyltestosterone ring structure, together with the corresponding 19-nor derivatives, display progestational properties; those possessing the dihydroxyacetone side-chain at the 17-position are anti-inflammatory substances; those derived from desoxycorticosterone exhibit salt-retaining activity; and the instant compounds characterized by the 17-spirolactone structure are aldosterone antagonists. In addition, the spiro-pyrazoline compounds of this invention are useful as intermediates to the corresponding spiro-cyclopropyl derivatives characterized by the following partial structural formula

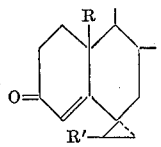

wherein R and R' are as defined as hereinbefore. Conversion to those spiro-cyclopropyl compounds is effected by heating at elevated temperature, optionally in a suitable organic solvent, or alternatively, at or near room temperature in the presence of a suitable catalyst. As a specific example, 17α-acetoxy-3,20-dioxo-spiro(pregn-4-ene-6,3'-1-pyrazoline) is heated at about 190° for approximately one hour under reduced pressure to afford 17α-acetoxy-3,20-dioxo-spiro(pregn-4-ene-6,1' - cyclopropane). The spiro-cyclopropyl compounds thus produced are valuable pharmacological agents also, possessing the properties characteristic of their spiro-pyrazoline precursors.

The invention will appear more fully from the examples which follow. These examples, however, are given by way of illustration only and are not to be construed as limiting the invention either in spirit or in scope as many modifications both in materials and methods will be apparent to those skilled in the art. Temperatures are given in degrees centigrade (° C.), and quantities of materials are expressed in parts by weight unless otherwise noted.

*Example 1*

To a solution of 3 parts of 17α-acetoxy-6-methylenepregn-4-ene-3,20-dione in 225 parts of tetrahydrofuran is added, dropwise over a period of about 5 minutes, a solution of 2 parts of diazomethane in 70 parts of ether. The resulting reaction mixture is stored at room temperature for about 13 days, after which time approximately 0.1 part of acetic acid is added in order to decompose the excess reagent. Evaporation to approximately ½ volume under reduced pressure affords an organic solution, which is diluted with water to precipitate the crude product. The resulting solid is collected by filtration, washed with water, and dried to afford 17α-acetoxy-3,20-dioxospiro(pregn-4-ene-6,3'-1-pyrazoline), melting at about 202-218° with decomposition. Purification by recrystallization from acetone-hexane affords the pure material, melting at about 216-223° with evolution of gas at about 190°. An ultraviolet absorption maximum is observed at about 237 millimicrons with a molecular extinction coefficient of about 14,400. In a potassium bromide disc, infrared peaks are observed at about 5.76, 5.82, 5.94, 6.22, and 7.90-7.98 microns. The nuclear magnetic resonance spectrum of this compound exhibits peaks at about 42, 75, 123, 127, 250-300, and 334 cycles per second. It is characterized further by the following structural formula

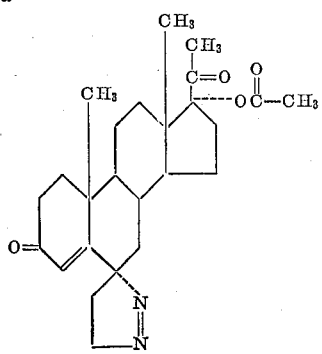

*Example 2*

To a solution of 3 parts of 17α-acetoxy-6-methylenepregn-4-ene-3,20-dione in 225 parts of tetrahydrofuran is added a solution of 2 parts of diazoethane in 70 parts of ether over a period of about 5 minutes. The resulting reaction mixture is kept at room temperature for about 2 days, and the excess reagent is then decomposed by the addition of approximately 0.1 part of acetic acid. Approximately one-half of the solvent is removed by distillation at reduced pressure, and the remaining organic solution is diluted with water. The tacky precipitate which forms is isolated by decantation, then is extracted with ether, and the resulting ether solution is washed with water. Drying of that organic solution over anhydrous sodium sulfate followed by evaporation to dryness under reduced pressure affords a residue, which is triturated with ether, then recrystallized from acetone-hexane to afford crystalline 17α-acetoxy-3,20-dioxo-spiro[pregn-4-ene-6,3'-(5'-methyl-1-pyrazoline)], melting at about 165-167° with evolution of a gas. Its ultraviolet spectrum exhibits a peak at about 237 millimicrons with a molecular extinction coefficient of about 13,750. Infrared maxima, in chloroform, are observed at about 5.75, 5.82, 5.98, 6.22, and 7.90-7.98 microns. Its structure is represented by the following formula

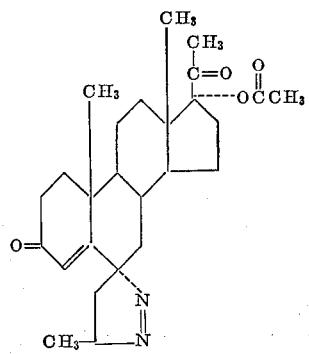

*Example 3*

To a solution of 2.67 parts of 17β-acetoxy-6-methyleneandrost-4-en-3-one in 225 parts of tetrahydrofuran is added a solution of 2 parts of diazomethane in 70 parts of ether over a period of about 5 minutes. The resulting reaction mixture is stored at room temperature for about 13 days, at the end of which time approximately 0.1 part of acetic acid is added to the mixture for the purpose of destroying any excess diazomethane. This mixture is then reduced to approximately one-half volume by distillation under reduced pressure, and water is added in order to precipitate the crude product. The solid which forms is collected by filtration and dried, then crystallized from acetone-hexane to afford 17β-acetoxy-3-oxo-spiro(androst-4-ene-6,3'-1-pyrazoline), melting at about 170-172° with evolution of a gas. An additional crystallization from acetone-hexane affords material melting at 173-175° with gas evolution. This substance displays an ultraviolet absorption maximum at about 237.5 millimicrons with a molecular extinction coefficient of about 13,900. Infrared peaks, in a potassium bromide disc, are observed at about 5.75, 5.95, 6.22, 6.42, and 7.98 microns. Its nuclear magnetic resonance spectrum exhibit peaks at about 52, 76, 123, 250-300 and 331 cycles per second. This compound is characterized further by the following structural formula

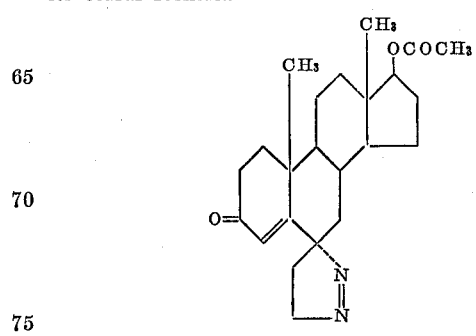

Example 4

To a solution of 1.92 parts of 3-(17β-hydroxy-6-methylene-3-oxoandrost-4-en-17α-yl) propionic acid lactone in 225 parts of tetrahydrofuran is added a solution of 2 parts of diazomethane in 70 parts of ether. This reaction mixture is kept at room temperature for about 13 days, after which time approximately 0.1 part of acetic acid is added in order to decompose any excess diazomethane. Removal of the ether by distillation at reduced pressure followed by dilution with water of the remaining organic solution results in precipitation of a tacky solid, which is extracted into ethyl acetate. The resulting organic solution is washed with water, dried over anhydrous sodium sulfate and stripped of solvent under reduced pressure. The residual foam-like product is crystallized from acetone-hexane to afford 3-[17β-hydroxy-3-oxo-spiro(androst-4-ene-6,3'-1-pyrazolin)-17α-yl] propionic acid lactone, melting at about 183–185° with evolution of a gas. A second recrystallization from acetone-hexane affords material melting at 190–192° accompanied by gas evolution. An ultraviolet absorption spectrum of this compound exhibits a peak at about 237.5 millimicrons with a molecular extinction coefficient of about 14,510. Infrared absorption maxima, in chloroform, are observed at about 5.62, 5.95, 6.12, and 6.22 microns. This compound displays also nuclear magnetic resonance peaks at about 60, 76, 148, 250–300, and 329 cycles per second. It is further characterized by the following structural formula

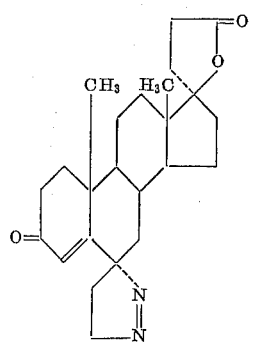

Example 5

When an equivalent quantity of 17β-hydroxy-6-methylene-17α-propynylandrost-4-en-3-one or 6-methylene-17β-propionoxyandrost-4-en-3-one is substituted in the procedure of Example 1, 17β-hydroxy-17α-propynyl-3-oxo-spiro(androst-4-ene-6,3'-1-pyrazoline) and 3-oxo-17β-propionoxy-spiro(androst-4-ene-6,3'-1-pyrazoline), respectively, are produced.

Example 6

The substitution of an equivalent quantity of 17α-ethyl-17β-hydroxy-6-methyleneandrost-4-en-3-one or 17a-ethynyl-17β-hydroxy-6-methyleneandrost-4-en-3-one in the procedure of Example 2 results in 17α-ethyl-17β-hydroxy-3-oxo-spiro[androst-4-ene-6,3,-(5'-methyl-1-pyrazoline)], and 17α-ethynyl-17β-hydroxy-3-oxo-spiro-[androst-4-ene-6,3'-(5'-methyl-1-pyrazoline)], respectively.

Example 7

When 3.1 parts of 6-methylene-17α-propionoxy-pregn-4-ene-3,20-dione is allowed to react with 3.3 parts of diazopropane according to the processes described in Example 1, 3,20-dioxo-17α-propionoxy-spiro[pregn-4-ene-6,3'-(5'-ethyl-1-pyrazoline)] is obtained.

Example 8

The substitution of an equivalent quantity of diazoethane in the procedure of Example 4 results in 3-{17β-hydroxy-3-oxo-spiro[androst-4-ene-6,3'-(5'-methyl-1-pyrazolin)]-17α-yl} propionic acid lactone.

Example 9

To a solution of 2.58 parts of 17β-hydroxy-17α-methyl-6-methyleneandrost-4-en-3-one in 225 parts of tetrahydrofuran is added a solution of 2 parts of diazomethane in 70 parts of ether, and the resulting reaction mixture is stored at room temperature for 13 days. Approximately 0.1 part of acetic acid is added, and the ether is removed by distillation at reduced pressure. Dilution with water results in precipitation of a solid which is extracted with ethyl acetate. The organic extract is washed with water, dried over anhydrous sodium sulfate, and evaporated to dryness, leaving a foam-like residue. Two recrystallizations from acetone-hexane produces pure 17β-hydroxy-17α-methyl-3-oxo-spiro-(androst-4-ene-6,3'-1-pyrazoline), melting at about 179–184° C with evolution of gas. It exhibits an ultraviolet absorption maximum at about 239 millimicrons with a molecular extinction coefficient of about 13,480, infrared absorption peaks, in chloroform, at about 2.75, 6.00, and 6.22 microns, and nuclear magnetic resonance peaks at about 61, 74, 76, 250–300, and 329 cycles per second. This compound is characterized by the following structural formula

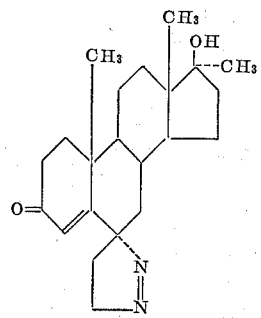

What is claimed is:

1. The process which comprises contacting a steriod, the A and B ring structure of which is represented by the partial structural formula

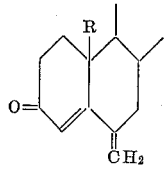

wherein R is selected from the group consisting of hydrogen and a methyl radical, with a diazo(lower alkane) to afford a compound represented by the following partial structural formula

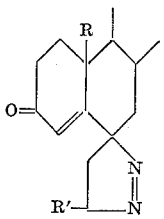

wherein R is selected from the group consisting of hydrogen and a methyl radical and R' is a member of the class consisting of hydrogen and a lower alkyl radical.

2. A compound of the formula

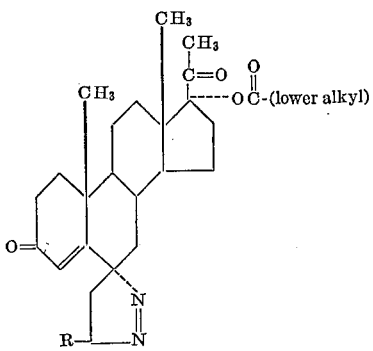

wherein R is a member of the class consisting of hydrogen and a lower alkyl radical.

3. 17α - acetoxy - 3,20 - dioxo - spiro(pregn - 4 - ene-6,3'-1-pyrazoline).

4. 17α - acetoxy - 3,20 - dioxo - spiro[pregn - 4 - ene-6,3'-(5'-methyl-1-pyrazoline)].

5. A compound of the formula

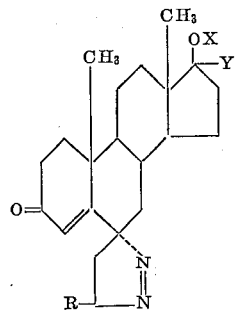

wherein R and Y are members of the class consisting of hydrogen and a lower alkyl radical, and X is selected from the group consisting of hydrogen and a lower alkanoyl radical.

6. 17β - acetoxy - 3 - oxo - spiro(androst - 4 - ene-6,3'-1-pyrazoline).

7. 17β - hydroxy - 17α - methyl - 3 - oxo - spiro-(androst-4-ene-6,3'-1-pyrazoline).

8. A compound of the formula

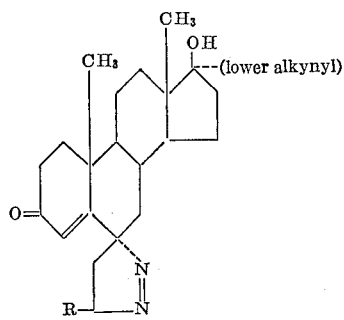

wherein R is a member of the class consisting of hydrogen and a lower alkyl radical.

9. 17α - ethynyl - 17β - hydroxy - 3 - oxo - spiro-androst-4-ene-6,3'-1-pyrazoline).

10. A compound of the formula

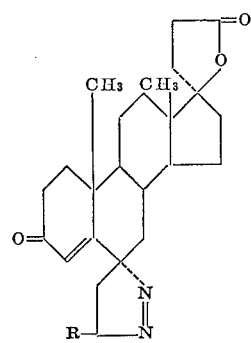

wherein R is selected from the group consisting of hydrogen and a lower alkyl radical.

11. 3 - [17β - hydroxy - 3 - oxo - spiro(androst - 4 - ene-6,3'-1-pyrazolin)-17α-yl] propionic acid lactone.

No references cited.

LEWIS GOTTS, *Primary Examiner.*

HENRY A. FRENCH, *Assistant Examiner.*